United States Patent
King

(10) Patent No.: US 10,151,036 B2
(45) Date of Patent: Dec. 11, 2018

(54) BYPASS ELECTROLYSIS SYSTEM AND METHOD

(71) Applicant: Forrest A. King, Ooltewah, TN (US)

(72) Inventor: Forrest A. King, Ooltewah, TN (US)

(73) Assignee: King Power Company LLC, Ooltewah, TN (US)

( * ) Notice: Subject to any disclaimer, the term of this patent is extended or adjusted under 35 U.S.C. 154(b) by 122 days.

(21) Appl. No.: 15/016,512

(22) Filed: Feb. 5, 2016

(65) Prior Publication Data

US 2016/0230293 A1    Aug. 11, 2016

Related U.S. Application Data

(60) Provisional application No. 62/112,201, filed on Feb. 5, 2015.

(51) Int. Cl.
| | |
|---|---|
| *C25B 13/02* | (2006.01) |
| *C25B 9/08* | (2006.01) |
| *C25B 1/10* | (2006.01) |

(52) U.S. Cl.
CPC ............... *C25B 1/10* (2013.01); *C25B 9/08* (2013.01); *C25B 13/02* (2013.01); *Y02E 60/366* (2013.01)

(58) Field of Classification Search
CPC .............................................. C25B 1/02–1/12
See application file for complete search history.

(56) References Cited

U.S. PATENT DOCUMENTS

| | | | | |
|---|---|---|---|---|
| 736,868 | A * | 8/1903 | McCarty | C25B 1/04 204/278 |
| 813,105 | A * | 2/1906 | McCarty | C25B 1/04 204/274 |
| 3,969,201 | A * | 7/1976 | Oloman | C25L 31/30 204/222 |
| 3,992,271 | A * | 11/1976 | Danzig | C25B 1/04 204/293 |
| 5,589,052 | A * | 12/1996 | Shimamune | C25B 1/10 205/349 |
| 5,690,797 | A * | 11/1997 | Harada | C25B 1/12 204/228.5 |
| 5,833,821 | A * | 11/1998 | Schmid | C25B 1/10 204/255 |
| 6,942,766 | B2 * | 9/2005 | Lemke | C02F 1/46104 204/242 |

(Continued)

OTHER PUBLICATIONS

Carmo et al, A comprehensive review on PEM water electrolysis, Internation Journal of Hydrogen Energy, vol. 38, Mar. 2013, pp. 4901-4934 (Year: 2013).*

(Continued)

*Primary Examiner* — Harry D Wilkins, III
(74) *Attorney, Agent, or Firm* — Kilpatrick Townsend & Stockton LLP

(57) ABSTRACT

A bypass electrolyzer system provides a system for separating oxygen and hydrogen from water, whereby electrodes are respectively disposed in first and second housings spaced apart by at least one membrane supported by at least one membrane holder. At least one bypass line connects the first and second housings so that during operation, hydrogen can pass to through the bypass line to the oxygen side and then back through the membrane to assist in equalizing pressure across the membrane during operation.

19 Claims, 2 Drawing Sheets

(56) References Cited

U.S. PATENT DOCUMENTS

| | | | | |
|---|---|---|---|---|
| 7,159,444 B2* | 1/2007 | Demarest | ............... | C25B 1/10 |
| | | | | 73/23.2 |
| 7,226,529 B2* | 6/2007 | Meltser | ............... | C25B 1/12 |
| | | | | 204/252 |
| 7,285,192 B2* | 10/2007 | Brand | ............... | C25B 1/12 |
| | | | | 204/257 |
| 9,017,528 B2* | 4/2015 | Papapanayiotou | .. | C25D 17/001 |
| | | | | 204/237 |
| 2003/0230495 A1* | 12/2003 | Anderson | ............... | C25B 1/12 |
| | | | | 205/743 |
| 2004/0020787 A1* | 2/2004 | Sano | ............... | C02F 1/4618 |
| | | | | 205/628 |
| 2004/0101741 A1* | 5/2004 | Minteer | ............... | C12N 11/08 |
| | | | | 429/401 |
| 2007/0284260 A1* | 12/2007 | Davidson | ............... | C25B 1/04 |
| | | | | 205/464 |
| 2008/0202942 A1* | 8/2008 | Wilkinson | ............... | C25B 1/04 |
| | | | | 205/742 |

OTHER PUBLICATIONS

Schroeder et al, Explosion Characteristics of Hydrogen-Air and Hydrogen-Oxygen Mixtures at Elevated Pressures, International Conference on hydrogen safety, Congress Palace, Pisa, Italy, Sep. 2005 (Year: 2005).*

Polymer electrolyte membrane electrolysis, Wikipedia, Nov. 2017 (Year: 2017).*

* cited by examiner

BYPASS ELECTROLYSIS SYSTEM AND METHOD

CLAIM OF PRIORITY

This application claims the benefit of U.S. Provisional Application No. 62/112,201 filed Feb. 5, 2015, which is included herein by reference, in its entirety.

FIELD OF THE INVENTION

The present invention relates to a method and apparatus for commercially producing hydrogen and/or oxygen.

BACKGROUND OF THE INVENTION

Electrolysis in commercial production normally occurs with many adjacent sets of plates for separating oxygen and hydrogen. Membranes between special cathodes and anodes with various catalysts are typically employed.

Improved methods and devices for electrolyzing water to form oxygen and hydrogen are believed to be necessary in the marketplace.

SUMMARY OF THE INVENTION

It is an object of many embodiments of the present invention to provide an improved electrolysis method and apparatus for separating hydrogen and oxygen from water.

It is another object of many embodiments of the present invention to provide a relatively inexpensive and highly efficient method and apparatus for separating hydrogen and water.

It is another object of many embodiments of the present invention to provide an improved method and apparatus for separating hydrogen and oxygen preferably utilizing a one way hydrogen bypass.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
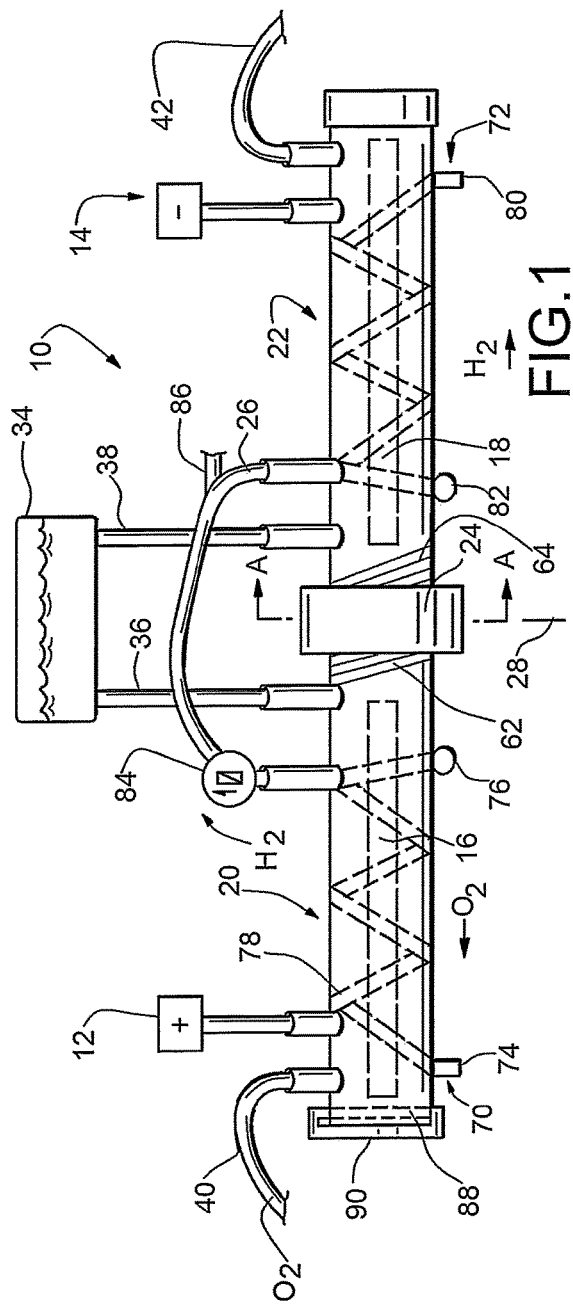
FIG. 1 is a side plan view of the presently preferred embodiment of the present invention.

FIG. 1 shows an electrolyzer 10 of the presently preferred embodiment of the present invention. When electrolyzing water into the components of hydrogen and oxygen, a positive/negative direct current charge can be provided and is represented by positive charge with positive pole 12 and negative charge with negative pole 14. These poles can be obtained from any direct current electrical power source. The applicant has successfully used solar panels providing a maximum of 28 V DC rather effectively. For at least some embodiments of this particular system, a robust design is provided which does not require any specific voltage or current requirement from the positive and negative electrical poles 12,14. The 28 V DC electrical solar panel may drop voltage and/or current with cloud cover conditions during the day. While output of oxygen and hydrogen may slow down, the output has been found to be more than satisfactory to run the system. In an industrial system, it may be that the voltage will be more consistent but there is certainly no need for such consistency with many embodiments of the preferred embodiments.

Current from positive connection 12 can be provided to an anode 16 run from a negative source 14 provided to cathode 18 internal to first and second housing portions 20,22, respectively which are preferably electrically separated but physically connected at a membrane holder 24 which could take various forms. Membrane holder 24 and/or portions thereof may be non-conductive to electricity. First and second housing portions 20,22 may be cylindrical for easy construction to accommodate various shapes of the anode 16 and the cathode 18 as would be understood by those of ordinary skill in the art. Other shaped first and second housing portions 20,22 could be utilized in other embodiments. Copper has been used for first and second housing portions 20,22 as has PVC and other materials. Anode 16 and cathode 18 are not electrically connected together within housing portions 20,22.

Unlike prior art electrical electrolyzers there may be a single anode 16 and cathode 18 as opposed to alternating series of sheets of such. Of course, there could be multiple anodes 16 and cathodes 18 with various embodiments preferably separated by a planar and/or other membrane wall in the preferred embodiments. By constructing it in this manner or otherwise, a hydrogen bypass line 26 can be provided as will be discussed in further detail below.

Figure 3:
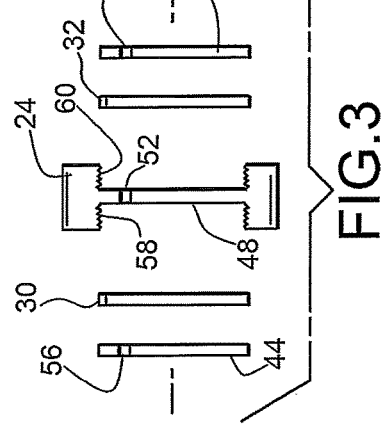
FIG. 3 is a cross-sectional view taking along line A-A of FIG. 2 with the membrane and cover plate included from internal portions of FIG. 1.
Figure 2:
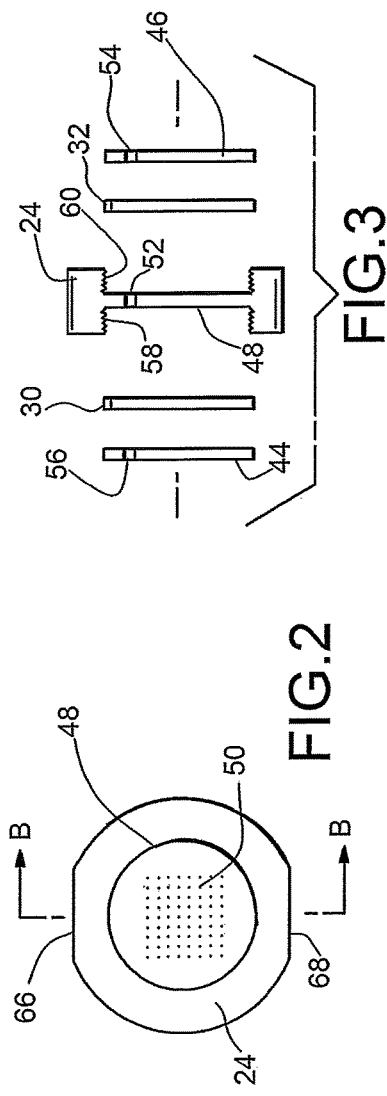
FIG. 2 is a cross sectional view taken along line A-A of FIG. 1.

Water is preferably provided to both sides of the membrane axis 28 or opposite membrane(s) 30,32. Other liquids such as other electrically active fluids could be used with other embodiments including ionic liquids and/or molten salts, etc. Membrane 30 and/or 32 may be provided as shown in FIG. 3 substantially along membrane axis 28 and parallel thereto for at least some embodiments. Membrane holder 24 is believed to be of somewhat unique a construction, however, membrane holders known in the art could be utilized as well. However, the preferred embodiment of this membrane holder 24 does not allow for flexure of the membrane. Membrane 30 and/or 32 is preferably secured within plates 44,46 and/or center support 48 in a secure manner. All of the anode(s) 16 may be on one side of the membrane(s) 30,32 and all of the cathode(s) 18 may be on the opposite side (i.e., for some embodiments the membrane place 28 may separate the cathode(s) 18 and anode(s) 16).

Fluid, such as water, from supply 34 can be provided through supply lines 36,38 into the first and second housing portions 20,22 respectively. When the DC charge is applied, power from positive and negative sources 12,14 enter the water in the housing portions 20, 22 and electrolysis can thereby commence which is preferably facilitated with a catalyst such as a platinum, cobalt and/or other catalyst material as are well known in the art to facilitate separating water into hydrogen and oxygen as the charges are applied. Hydrogen and oxygen are preferably separated. Oxygen will be directed toward the anode 16 and discharged. As the oxygen has a high degree of electro-negativity (a 3.4 on a scale of 4) thus causing the oxygen to be held in a charged field. Meanwhile, the hydrogen that builds up can be bypassed through hydrogen bypass 26 to the oxygen side whereby the hydrogen almost immediately passes somewhat in a one way direction through the membrane(s) 30 and/or 32 back to the hydrogen side to effectively increase the pressure on the system while also contributing to the purity of the hydrogen drawn off the hydrogen line. Oxygen may be drawn off the oxygen line 40 in a steady manner. As has been discovered by the applicant, the relative scale of the system can be scaled relative to any scale even easily up to 500 KW which could produce roughly 2,000 cubic feet of oxygen per hour and 4,000 cubic feet of hydrogen per hour.

Catalyst may include potassium hydroxide and other catalysts for such members.

For the membrane, membranes for use with electrolysis are well known 30,32 and they can be made various thicknesses depending on the efficiency and the pressures exerted. In order to minimize wear and tear on the membranes 30,32, membrane perforated holding plates 44,46 can be utilized to hold the membranes 30,32 against a water support membrane holder 24. The membrane holder 24 preferably has a center support 48 which has perforations 50 as do the plates 44,46 whereby the perforations 50 are effectively illustrated as bores 52,54,56 and extend through respective member membrane holder 24 and plates 46 and 44 respectively. This way, in order to change the membranes especially the membrane holder if utilized as per the preferred embodiment having internally directed threads 58,60 which not only receive the plates 44,46, but also threaded connections 62,64 of first and second housing portions 20,22 respectively so that the membrane holder 24 could be relatively easily changed out by putting a wrench on flats 60,68. The membrane housing 24 may seal against first and second housing portions 20,22 in the in use position and yet be unscrewed to replace membranes 30,32 as would be understood by those of ordinary skill in the art. Center support 48 need not be used in all embodiments. By securing the membranes 30,32 against the center portion 48 with the plates 44,46 the membranes cannot pulse in and out as they are retained in position and are held safely. Even without the center portion 48, the membranes 30,32 should not pulsate.

The applicant has discovered that the hydrogen bypass line 26 can significantly reduce the heat created by the system. The system has been effectively operated at about 50 to about 100 psi. Heat exchangers 70,72 are provided for cooling of both the first and second housing portions 20,22 of the preferred embodiment. Heat exchanger 70 can direct cooling through in and out of first and second ports 74,76 such as through internal exchanger internal pipes 78 as would be understood by those of ordinary skill in the art. Similarly, the second heat exchanger 72 may be similarly or dissimilarly constructed with cooling lines internally directed through first and second ports 80,82.

With what is believed to be a unique construction for some embodiments, membrane holder 24 can effectively be a single piece type structure to assist in preventing leaks from housing portions 20,22. Threads 62,64 can securely connect to the membrane holder 24. The plates 44,46 can assist in connecting the membranes 30 and/or 32 mechanically while not pulsating.

Hydrogen bypass line 26 can emphasize the electronegativity of oxygen which may assist in the separation of hydrogen from the oxygen. Furthermore, the bypass line may also assist at reducing the flux on the membrane or membranes 30,32 to thus provide for superior hydrogen and oxygen separation directed through the respective outlets 40,42 possibly producing less heat.

By using the bypass line with a check valve 84, effectively one way gas separation can occur to assist in reducing heat build-up and to reduce the potential surface area needed for separation versus conventional electrolyzer constructions.

Hydrogen bypass line 26 can also serve as an extra safety line to a port 86. This could potentially be opened to evacuate hydrogen gas if necessary such as in an emergency or otherwise. Check valve 84 can control the flow of gas for separation to occur in a cyclical manner. One way flux across the membrane is believed to increase the efficiency of the unit.

In earlier prototypes, the applicant discovered that double sealing the housings 20,22 was one effective way to mechanically seal versus plate edges to prevent hydrogen leakage. This can be performed by various means such as by having an internal plug 88 cooperating internal to an external plug 90 as would be understood by those of ordinary skill in another method.

Internal piping 78 in the heat exchangers 70,72 can take away heat as would be understood by those of ordinary skill in the art with cooler fluid directed in one port 80,82 and warmer fluid directed out of the other port 80,82, etc.

The design of this electrolyzer 10 is believed to be different from those of prior art designs. Although one set of cathodes and anodes 16,18 is illustrated in the preferred embodiment, multiple cathodes 18 and anodes 16 could be provided on opposite sides of the membrane plane 28 with the hydrogen bypass 26 connecting the opposing sides for gas fluid flow while still maintaining the electrical separation necessary to conduct electrolysis. This is believed to be a novel feature while the hydrogen and oxygen are directed out of opposing ports 40,42 with the hydrogen able to cross through the membrane(s) 30, and/or 32 as would be understood by those of ordinary skill in the art particularly as the hydrogen is small enough to pass through the membrane in a more efficient manner than other ions due to its extremely small size.

The bypass electrolysis system, or electrolyzer 10, has positively and negatively charged electrodes such as anode 16 and cathode 18 which can be separately disposed in first and second housings 20,22, respectively. Liquid, preferably water, but possibly containing other dissolved materials and/or fluids such as ionic fluids, molten salts or other fluids, is separated relative to the first and second housings 20,22 by at least one membrane 30 and/or 32 with at least one membrane holder 24. The membranes 30 and/or 32 provide an ability to allow hydrogen to pass, while preventing the flow of liquid between the first and second housings. In some embodiments, the membrane is sized to allow oxygen to flow through, but not water.

Additionally, the first housing 20 has an oxygen outlet 40, the second housing 22 has a hydrogen outlet 42, for respectively directing the gasses from the electrolyzer 10 when used as an electrolyzer 10 in operation. Furthermore, at least one hydrogen bypass line is preferably provided during electrolysis of water into component hydrogen and oxygen to at least assist in passing hydrogen from the cathode side (second housing 22) to the anode side (first housing 20) to assist in equalizing pressure across the at least one membrane 30 and/or 32, principally due to the high electronegativity of oxygen and thus its attraction to the anode 16 and out the oxygen outlet 40.

A check valve 84 can be located in the bypass line 26 to assist in proper direction of passing hydrogen (but preferably for many embodiments, not passing oxygen) from the second housing 22 to the first housing 20, .and not passing fluid or gasses from the first housing 20 to the second housing 22. Either of the electrodes 16,18 can be horizontally disposed/oriented in a portion of the first and second housings 20,22 respectively, such as in a cylindrical portion of each. The cylindrical portions can extend toward the membrane housing 24. Other embodiments, such as the embodiment of FIG. 4, may have vertically oriented electrodes, possibly extending in vertically extending cylindrical portions as will be explained in further detail below.

Catalysts, such as on or part of the electrodes and/or in solution of the liquid are within at least one of the first and second housings 20,22 for many embodiments.

Perforated holding plates 44,46 are useful to hold the membranes 30 and/or 32 o the membrane holder 24. These can threadedly connect to the membrane holder 24 which can at least assist in supporting the at least one membrane 30 and/or 32. Furthermore, the membrane holder 24 can threadably connect to portions of the housings 20,22 as described above or otherwise. A hydrogen port 86 on the bypass line 26 can be useful for some embodiments.

Multiple electrodes 16, 18 within either of the housings 20,22 may be appropriate for some embodiments as well.

Figure 4:
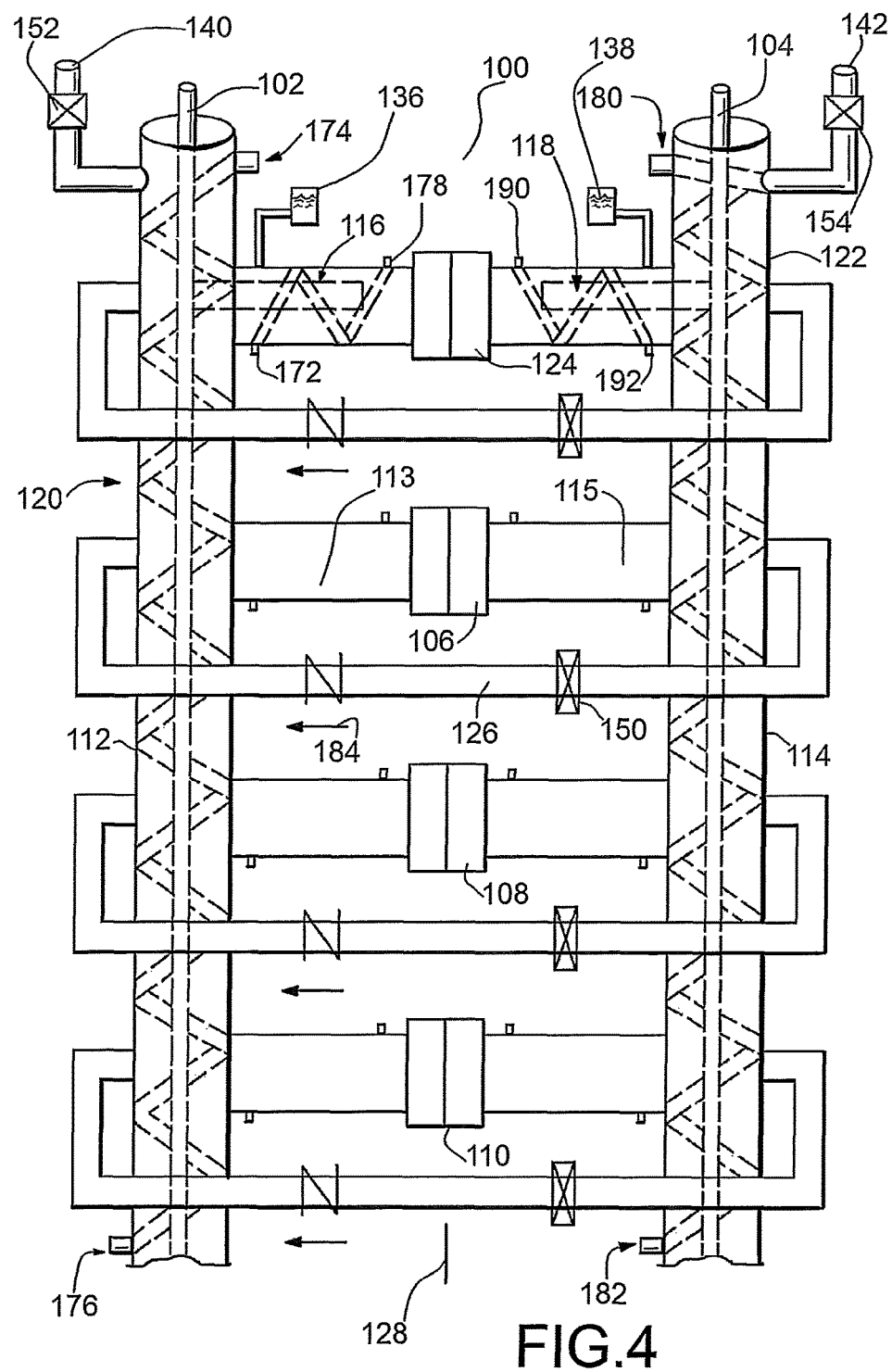
FIG. 4 is a side plan view of an alternatively preferred embodiment of the present invention.

FIG. 4 shows an alternatively preferred embodiment of the present invention in the form of a system 100 having electrodes in the form of anode(s) 116 and cathode(s) 118 which could be vertical anode 102 and vertical cathode 104 or horizontally disposed as shown, or otherwise. Fluid supplies 136 and 138 may be useful to replenish fluids to either side of the membranes in the membrane holders 124, 106,108 and 110. Four membrane holders 124,106,108,110 are shown, there could be more or fewer in other embodiments, and although they are shown along a membrane plane 128, other embodiments may be constructed differently.

Heat exchanger inlet 174 and outlet 176 may cool vertical portion 112 of first housing 120. Heat exchanger inlet 180 and outlet 182 may cool vertical portion 114 of second housing 122. Heat exchanger inlet 172 and outlet 182 may cool horizontal portion 113 of first housing 120. Heat exchanger inlet 190 and outlet 192 may cool horizontal portion 115 of second housing 122. Similar heat exchanger inlets 172,190 and outlets 182,192 can be provided for the various horizontal portions (cylindrical for many embodiments which can for tee's with cylindrical vertical portions, if so constructed) of housings 120,122 as well.

By providing a vertical arrangement as shown in FIG. 4 versus the construction of FIG. 1, it may be that flux, and thus output, can be significantly increased with an at least somewhat vertical orientation of system 100, such as at least three, if not seven fold. Furthermore, multiple electrodes, whether horizontal and/or vertical can be provided either on the cathode or anode side.

Bypass lines 126 are shown with check valves 184 and also valves 150 so as to be able to secure the bypass line 126 under certain circumstances (some embodiments may not require bypass lines 126). For instance if the system 100 or 10 were run in reverse, it could be a fuel cell. Specifically, oxygen and hydrogen could be input, such as through ports 140 and 142 (referred to as oxygen outlet 140 and hydrogen outlet 142) to then combine in the system 100 to form water and give off heat (which could be used by heat exchangers shown, or others) and meanwhile provide a potential across anode and cathode 116,118 which could drive an electrical load as a fuel cell or otherwise. Bypass lines 126 may not be so useful for many embodiments of a fuel cell operation since the pressures could be controlled on both sides of membrane(s) 130 and/or 132 such as by monitoring pressures and/or using valves 152,154.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A bypass electrolysis system comprising:
   positive and negatively charged electrodes separately disposed in a liquid in first and second housings, respectively, said liquid in the first and second housings separated by at least a first and a second membrane in a membrane holder, said first and second membranes capable of allowing hydrogen to pass, therethrough while preventing the liquid from passing therethrough, and said membrane holder comprising a center support disposed between the first and second membranes;
   the first housing having an oxygen outlet capable of directing oxygen out of the first housing during operation;
   the second housing having a hydrogen outlet capable of directing hydrogen out of the second housing during operation;
   wherein the first and second housings are in fluid communication through at least one conduit.

2. The bypass electrolysis system of claim further comprising a check valve in the at least one conduit, wherein the check valve is capable of permitting flow from the second housing to the first housing while preventing flow from the first housing to the second housing.

3. The bypass electrolysis system of claim 1, wherein at least one of the positive and negatively charged electrodes are horizontally oriented.

4. The bypass electrolysis system of claim 1, further comprising housing portions of the first and second housings having cylindrical members extending toward the membrane holder.

5. The bypass electrolysis system of claim 4, having horizontally extending electrode portions within the housing portion having cylindrical members extending toward the membrane holder.

6. The bypass electrolysis system of claim 4, having horizontally oriented electrodes within the cylindrical members.

7. The bypass electrolysis system of claim 1, further comprising housing portions of the first and second housings having vertical cylindrical portions surrounding the electrodes which extend vertically therein.

8. The bypass electrolysis system of claim 7, having multiple membranes and membrane holders between the first and second housings.

9. The bypass electrolysis system of claim 8, wherein the first and second housings are in fluid communication through multiple conduits.

10. The bypass electrolysis system of claim 1, further comprising a catalyst selected from the group of potassium hydroxide, platinum, and cobalt, said catalyst located in at least one of the first and second housings.

11. The bypass electrolysis system of claim 1, wherein the membrane holder has perforated holding plates connected thereto.

12. The bypass electrolysis system of claim 11, further comprising first and second holding plates threadedly connected into the membrane holder at least assisting in supporting the at least one membrane.

13. The bypass electrolysis system of claim 1, wherein the center support has bores there through.

14. The bypass electrolysis system of claim 1, wherein the membrane holder is threadedly connected to horizontally oriented portions of the first and second housings.

15. The bypass electrolysis system of claim 1, wherein at least one of the first and second housings comprises a heat exchanger to remove heat during operation.

16. The bypass electrolysis system of claim 1, wherein the conduit has a port thereon.

17. The bypass electrolysis system of claim 1, further comprising multiple cathodes in the second housing.

18. The bypass electrolysis system of claim 1, further comprising multiple anodes in the first housing.

19. The bypass electrolysis system of claim 1, wherein the membrane is sized to allow oxygen to flow through, but not water.

\* \* \* \* \*